(12) United States Patent
Barbu et al.

(10) Patent No.: US 11,882,466 B2
(45) Date of Patent: Jan. 23, 2024

(54) CALIBRATING BEAM ORIENTATION ERRORS FOR IMPROVED POSITIONING

(71) Applicant: Nokia Technologies Oy, Espoo (FI)

(72) Inventors: Oana-Elena Barbu, Aalborg (DK); Ryan Keating, Chicago, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 56 days.

(21) Appl. No.: 17/205,202

(22) Filed: Mar. 18, 2021

(65) Prior Publication Data

US 2022/0014949 A1 Jan. 13, 2022

Related U.S. Application Data

(60) Provisional application No. 63/049,426, filed on Jul. 8, 2020.

(51) Int. Cl.
*H04W 24/08* (2009.01)
*H04W 4/029* (2018.01)
*H04W 4/02* (2018.01)

(52) U.S. Cl.
CPC ........... *H04W 24/08* (2013.01); *H04W 4/027* (2013.01); *H04W 4/029* (2018.02)

(58) Field of Classification Search
CPC ........... H04L 1/1867; H04L 2001/0093; H04L 2001/0097; H04L 1/1861; H04B 7/0695
See application file for complete search history.

(56) References Cited

U.S. PATENT DOCUMENTS

| 10,517,061 | B1 | 12/2019 | Kumar et al. | |
|---|---|---|---|---|
| 11,477,752 | B1 * | 10/2022 | Harrebek | G01S 5/021 |
| 2006/0009235 | A1 | 1/2006 | Sheynblat et al. | |
| 2015/0257121 | A1 * | 9/2015 | Siomina | H04W 64/003 |
| | | | | 455/456.6 |
| 2019/0037529 | A1 | 1/2019 | Edge et al. | |
| 2019/0230475 | A1 | 7/2019 | Edge et al. | |
| 2019/0265367 | A1 | 8/2019 | Silverman et al. | |
| 2019/0320364 | A1 * | 10/2019 | Jeon | H04W 72/046 |
| 2020/0120479 | A1 | 4/2020 | Ryden et al. | |

(Continued)

FOREIGN PATENT DOCUMENTS

| CN | 111095821 A | * | 5/2020 | ......... H04B 7/18508 |
|---|---|---|---|---|
| EP | 1389735 A1 | | 2/2004 | |

(Continued)

OTHER PUBLICATIONS

Invitation to Pay Additional Fees received for corresponding Patent Cooperation Treaty Application No. PCT/EP2021/055839, dated May 31, 2021, 12 pages.

(Continued)

*Primary Examiner* — Mounir Moutaouakil
(74) *Attorney, Agent, or Firm* — SQUIRE PATTON BOGGS (US) LLP

(57) ABSTRACT

Systems, methods, apparatuses, and computer program products for calibrating beam orientation errors for improved positioning. For example, certain embodiments may utilize collection of various measurements to compute, and correct for, beam orientation errors. Additionally, or alternatively, certain embodiments may collect information about propagation conditions in a network and may establish virtual anchors for the network.

5 Claims, 7 Drawing Sheets

(56) References Cited

U.S. PATENT DOCUMENTS

| | | | |
|---|---|---|---|
| 2020/0145977 A1 | 5/2020 | Kumar et al. | |
| 2021/0250816 A1* | 8/2021 | Xu | H04W 36/0016 |
| 2022/0140874 A1* | 5/2022 | Vemuri | H04L 5/0023 375/267 |

FOREIGN PATENT DOCUMENTS

| | | |
|---|---|---|
| EP | 1501153 A1 | 1/2005 |
| EP | 2001145 A2 | 12/2008 |
| EP | 3683984 A1 | 7/2020 |
| WO | 2016/062190 A1 | 4/2016 |
| WO | 2019/010380 A1 | 1/2019 |
| WO | 2019/047831 A1 | 3/2019 |

OTHER PUBLICATIONS

International Search Report and Written Opinion received for corresponding Patent Cooperation Treaty Application No. PCT/EP2021/055839, dated Jul. 22, 2021, 24 pages.

Fischer, "Introduction to OTDOA on LTE Networks", Qualcomm Technologies, Inc., Aug. 7, 2014, pp. 1-18.

Indian Office Action corresponding to IN Application No. 202347006997, dated Jul. 12, 2023.

"3rd Generation Partnership Project; Technical Specification Group Radio Access Network; Study on channel model for frequencies from 0.5 to 100 GHz (Release 16)", 3GPP TR 38.901, V16.1.0, Dec. 2019, pp. 1-101.

"Revised WID: NR Positioning Support", 3GPP TSG RAN Meeting #84, RP-192581, Agenda : 9.4.7, Intel Corporation, Jun. 3-6, 2019, 6 pages.

"3rd Generation Partnership Project; Technical Specification Group Radio Access Network; NR; Physical layer measurements (Release 16)", 3GPP TS 38.215, V16.0.1, Jan. 2020, pp. 1-21.

Rastorgueva-Foi et al., "Beam-based Device Positioning in mmWave 5G Systems under Orientation Uncertainties", 52nd Asilomar Conference on Signals, Systems, and Computers, Oct. 28-31, 2018, pp. 3-7.

Xiong et al., "TDOA Localization Algorithm with Compensation of Clock Offset for Wireless Sensor Networks", China Communications, vol. 12, No. 10, Oct. 2015, pp. 193-201.

"3rd Generation Partnership Project; Technical Specification Group Radio Access Network; LTE Positioning Protocol (LPP)(Release 15)", 3GPP TS 37.355, V15.0.0, Dec. 2019, pp. 1-224.

"3rd Generation Partnership Project; Technical Specification Group Radio Access Network; NG-RAN; NR Positioning Protocol A (NRPPa) (Release 15)", 3GPP TS 38.455, V15.2.1, Jan. 2019, pp. 1-60.

"3rd Generation Partnership Project; Technical Specification Group Radio Access Network; NR; Physical layer procedures for data (Release 16)", 3GPP TS 38.214, V16.0.0, Dec. 2019, pp. 1-148.

* cited by examiner

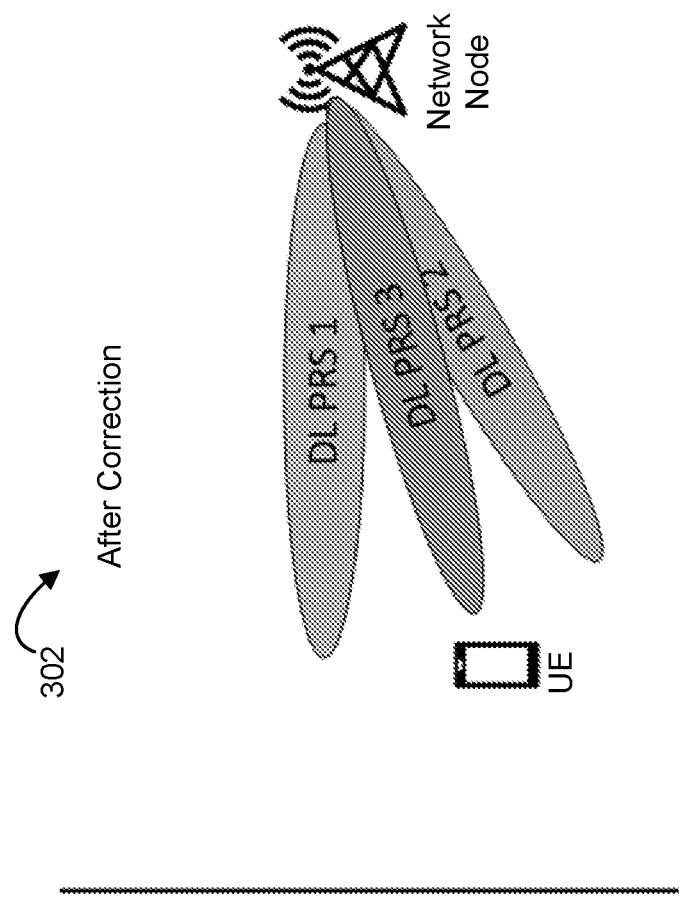
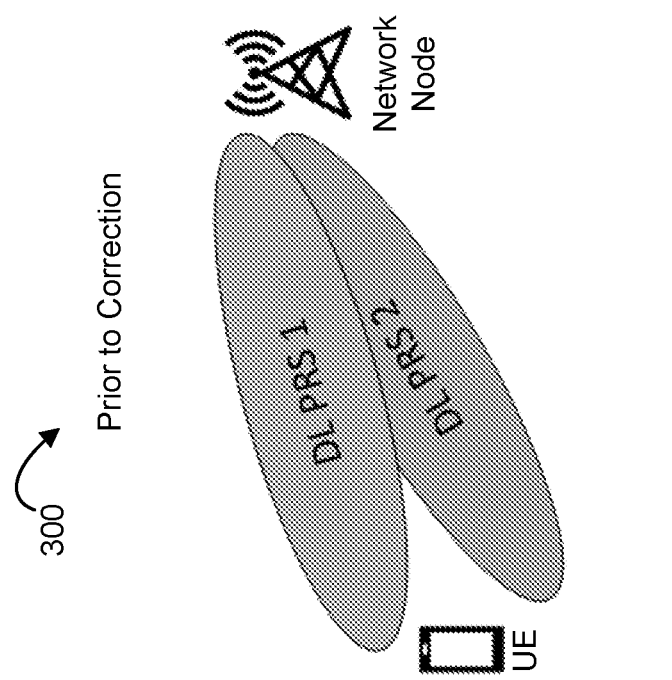
Fig. 3

US 11,882,466 B2

CALIBRATING BEAM ORIENTATION ERRORS FOR IMPROVED POSITIONING

RELATED APPLICATION

This application claims priority to U.S. Provisional Application No. 63/049,426, filed on Jul. 8, 2020, which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for calibrating beam orientation errors for improved positioning.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

BRIEF DESCRIPTION OF THE DRAWINGS

For proper understanding of example embodiments, reference should be made to the accompanying drawings, wherein:

FIG. 3 illustrates an example of a beam update, according to some embodiments;

DETAILED DESCRIPTION

Figure 1:
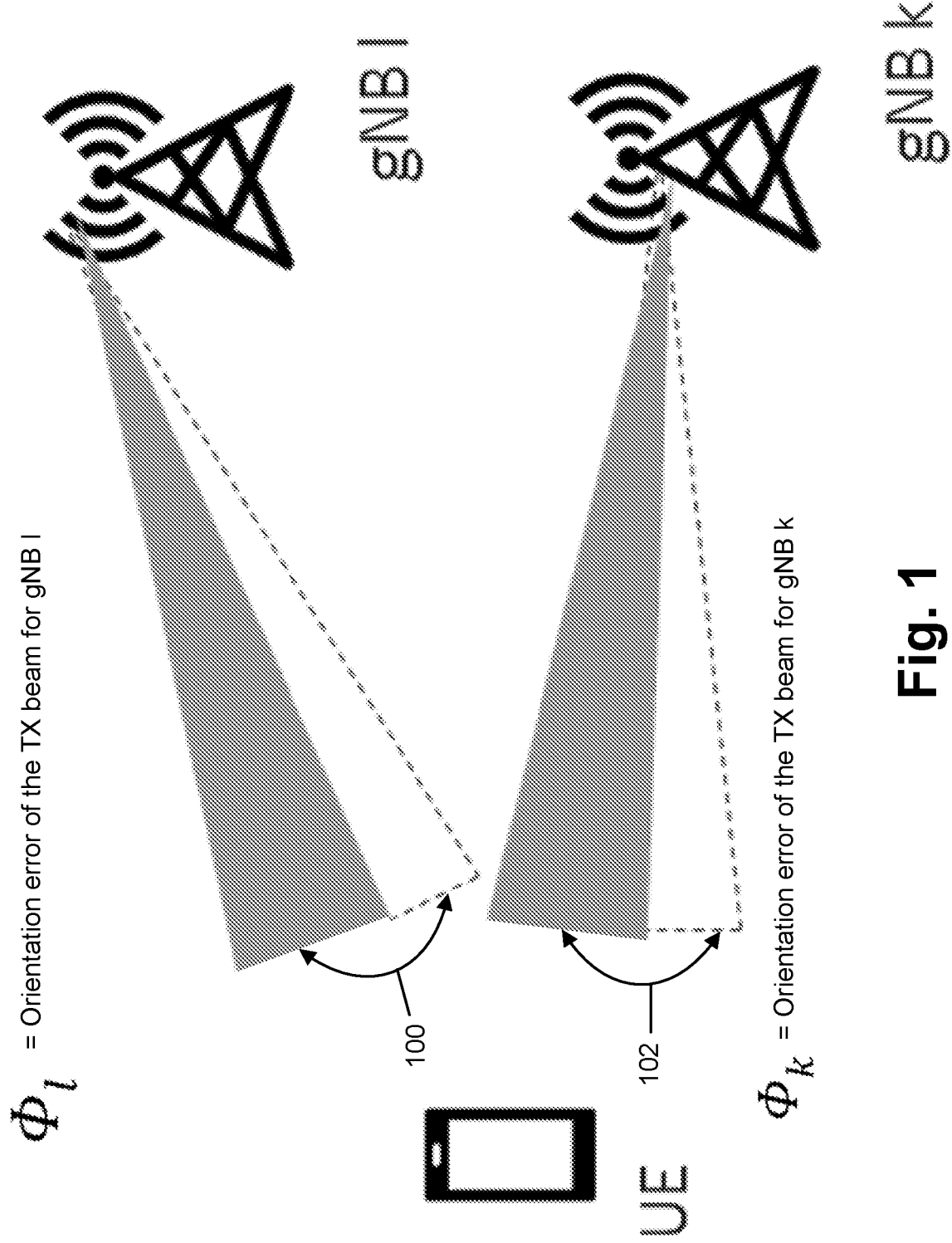
FIG. 1 illustrates an example of orientation errors at two network nodes, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for calibrating beam orientation errors for improved positioning is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

In NR, certain positioning features may include use of a downlink angle of departure method (DL-AoD). The DL-AoD method may function by having one or more network nodes (e.g., gNBs) transmit downlink positioning reference signals (DL PRSs) that are received at a UE. The UE may then measure a reference signal received power (RSRP) of the DL PRS and may report the measured values to another network node (e.g., a location management function (LMF)). The LMF may use the DL PRS RSRP to estimate the AoD from each gNB and may use the AoD to estimate the UE position via triangulation. The LMF may use information on the beam direction provided by the gNB(s). DL PRSs may include support for beamformed signals so that the AoD can be estimated based on the beam direction. Although some embodiments herein may be described using a DL PRS, it will be understood that another type of reference signal used for positioning purposes (e.g., CSI-RS, SSB, and/or the like) may be used.

Positioning algorithms may rely on the acquisition and reporting of different delay or angular metrics that implicitly characterize the distance between the UE and a gNB. Time of arrival (ToA) methods may rely on the detection of the delay of a line-of-sight (LoS) component. Angle-based methods (e.g., angle of arrival (AOA), or DL-AoD) may use the AOA or AoD from multiple gNBs in order to perform multilateration or triangulation to determine the UE position. Angle-based positioning may, however, be sensitive to orientation uncertainties at the gNB. Specifically, each gNB may introduce orientation errors in beamed transmissions. That is, each beam may be sent under an angle characterized by an unknown error $\Phi$. Such situation is illustrated in FIG. 1, which illustrates an example of orientation errors at two network nodes (e.g., gNBs). In particular, the beam orientation errors are illustrated at 100 and 102 for gNBs 1 and k, respectively, as the difference between the gray beams and the dashed beams.

Some embodiments described herein may provide for calibrating beam orientation errors for improved positioning. For example, certain embodiments may utilize collection of various measurements to compute, and correct for, beam orientation errors. Additionally, or alternatively, certain embodiments may collect information about propagation conditions in a network and may establish virtual anchors for the network. In this way, certain embodiments may provide for identification and correction of measurements related to, for example, an AoD, thereby improving an accuracy of position estimates for a UE. Additionally, or alternatively, in this way, certain embodiments may provide for correction of DL beam (e.g., DL PRS) coverage gaps, thereby improving beam coverage in a network. These improvements may conserve processing resources (e.g., of a UE and/or a network node) and/or network resources that would otherwise be consumed through less accurate position estimates and/or worse beam coverage.

Figure 2:
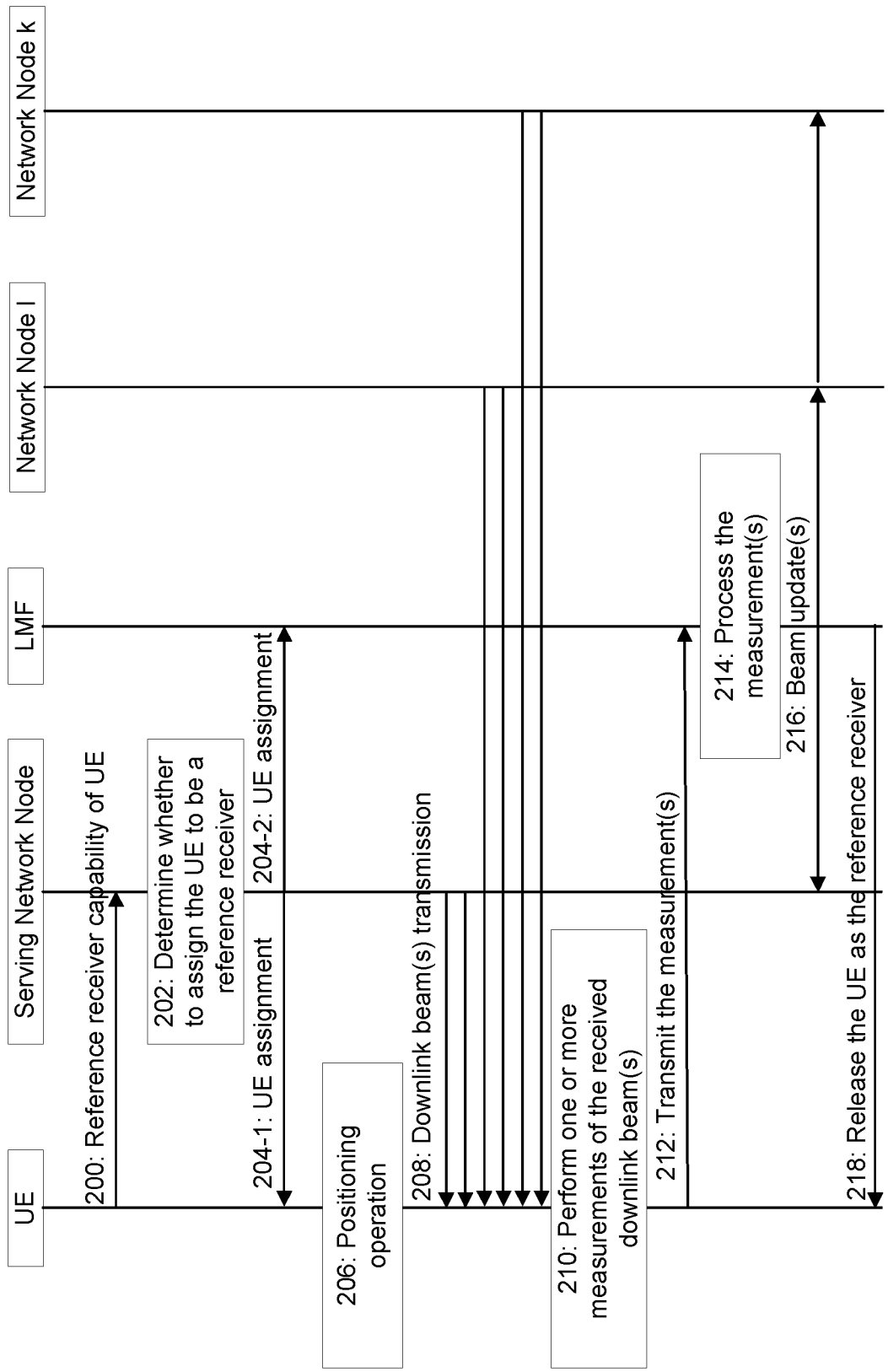
FIG. 2 illustrates an example signal diagram of calibrating beam orientation errors for improved positioning, according to some embodiments.

FIG. 2 illustrates an example signal diagram of calibrating beam orientation errors for improved positioning, according to some embodiments. FIG. 2 illustrates a UE, a serving network node (e.g., a serving gNB), an LMF (as another network node), and network nodes 1 and k (e.g., as additional non-serving gNBs).

As illustrated at 200, the UE may transmit, and the serving network node may receive, information that identifies a reference receiver capability of the UE. For example, the information may identify whether the UE has acquired the UE's position (e.g., a global navigation satellite (GNSS) position) within a threshold amount of time (e.g., in the last X seconds (s), milliseconds (ms), etc.), whether the UE is travelling at a speed that satisfies a threshold (e.g., at a speed indicative of pedestrian or low vehicular speed, where Doppler shift may be negligible), whether the UE has been a reference receiver within a threshold amount of time (e.g., in the last Y s, ms, etc.), and/or the like. Additionally, or alternatively, the UE may transmit information that identifies an accuracy or a quality of the UE's positioning capabilities (e.g., GNSS or other non-cellular positioning capabilities). For example, if the UE is using high accuracy positioning operations, such as real time kinematic-GNSS (RTK-GNSS), this may qualify the UE to be a reference receiver.

As illustrated at 202, the serving network node may determine whether to assign the UE to be a reference receiver. For example, this determination may be based on the information received from the UE at 200. The determination may be triggered by the serving network node detecting low-quality position estimates (by another UE using the same serving beam as the UE depicted in FIG. 2) that occur at a rate that satisfies a threshold (e.g., issues with a DL-AoD are detected), ping-pong handovers at a rate that satisfies a threshold, determining that the serving network node needs to perform a virtual anchor determination for the serving beam of the UE, determining that an update to the serving beam has occurred, and/or the like. A UE that is served by a same serving beam as another UE may, for example, be served by a same transmission beam from a serving network node or have identified a same CSI-RS as the best beam or the beam to use. In some embodiments, the LMF, rather than the serving network node, may perform the determination at 202. In this case, the serving network node may transmit at least some of the information for making the determination to the LMF so that the LMF can perform the determination.

The serving network node or the LMF may update a downlink beam configuration (e.g., of a DL-PRS) prior to initiating the remaining operations illustrated in FIG. 2 to test specific beams. For example, the DL PRS configuration may be updated to include more frequent transmissions to enable the UE to finish the procedure faster and/or with additional averaging of measurements.

Assuming for the example of FIG. 2 that the serving network node determines to assign the UE to be the reference receiver, the serving network node may transmit, and the UE may receive information that identifies the assignment of the UE, as illustrated at 204-1. The information transmitted to the UE may include an indication that the UE is to operate as the reference receiver, may identify one or more measurements that the UE is to perform and/or a frequency at which the UE is to perform the one or more measurements, and/or the like. Additionally, or alternatively, the serving network node may transmit this information to the LMF, at 204-2. The LMF may transmit, and the UE may receive, updated assistance data (e.g., DL-AoD assistance data) that includes, for example, specific measurement requests, reporting criteria, averaging requests, and/or the like.

If the LMF performs the determination related to assigning the UE to be the reference receiver, then the serving network node may not transmit to the LMF at 204-2 and the LMF may transmit the information to the UE to inform the UE about the assignment of the UE's assignment, to inform the UE about the one or more measurements that the UE is to perform, the frequency of performing the one or more measurements, and/or the like. For example, the LMF may transmit this information in the form of a LTE positioning protocol (LPP) message.

As illustrated at 206, the UE may perform a positioning operation. For example, the UE may perform a GNSS positioning measurement based on receiving the indication that the UE is to operate as the reference receiver. As illustrated at 208, the serving network node, the network node 1, and/or the network node k may transmit downlink beam(s) (e.g., DL PRSs) toward the UE, and the UE may receive one or more of the downlink beam(s). As illustrated at 210, the UE may perform one or more measurements of the received downlink beam(s). The one or more measurements may include at least one of a GNSS location of the UE (e.g., a soft location estimate that includes a mean of multiple estimates and a variance of the estimates), an RSRP of one or more of the downlink beam(s) (e.g., such that AoD can be estimated by the LMF), an orientation of the UE, an AoA of one or more of the downlink beam(s) (including AoA of multiple paths per beam, in some embodiments), a LoS probability of a detected beam for a network node, and/or the like.

As illustrated at 212, the UE may transmit, and the LMF may receive, the measurement(s). For example, the UE may transmit information that identifies the measurement(s) after performing the measurements, during performance of the measurements, and/or the like.

As illustrated at 214, the LMF may process the measurements. In certain embodiments, the LMF may determine one or more beam orientation errors, or other beam coverage issues, at one or more of the network nodes based on the measurement(s). For example, the LMF may process the measurement(s) from the UE to estimate the beam orientation errors Φ. In certain embodiments, the LMF may determine one or more corrections for one or more other UEs (e.g., UEs different than the UE assigned to be the reference receiver). The one or more estimates may be associated with correcting location estimates (e.g., correcting angle errors) by the one or more other UE(s).

In certain embodiments, the LMF may generate a propagation map based on the one or more measurements in association with processing the measurements. For example, the LMF may use the one or more measurements to generate a propagation map, or enhance an existing propagation map. This map may associate a channel impulse response to a location and may be used for one or more radio resource management functions, such as resource allocation, handover decision, and/or the like.

In certain embodiments, the LMF may define one or more virtual anchors with respect to the virtual map. A virtual anchor may include a virtual representation of a physical object with a known location that acts as a reflector for a radio frequency (RF) signal. For example, if the LMF determines that a building located at [x, y, z] position reflects a beam from a particular network node, then the building may become a virtual source, and the ToA of the beam reflected by the building may represent an additional measurement. The map and/or the virtual anchor(s) may be generated using measurements from several reference receivers. The LMF may utilize machine learning techniques to generate the map and/or the virtual anchors.

As illustrated at 216, the LMF may transmit, and the serving network node, the network node 1, and/or the network node k may receive, one or more beam updates. For example, the LMF may transmit information that identifies the one or more corrections to the beam orientation(s) that the LMF determined. The LMF may transmit an update for beam steering of a downlink beam (e.g., a DL PRS) in order to fill coverage gaps, respond to changes in environment, and/or the like. By transmitting this information, the LMF may alert one or more of the network nodes about the location of problematic beam coverage and/or may request one or more of the network nodes to update the beam steering. After receiving the information from the LMF, a network node may correct one or more beams based on the one or more corrections. For example, a network node may point the one or more beams in a problematic direction to improve the positioning performance of UE(s) other than the reference receiver UE(s). In certain embodiments, the LMF may transmit an updated configuration for one or more of the beams to be corrected.

As illustrated at 218, the serving network node may transmit, and the UE may receive, a release of the UE as the reference receiver. The UE may stop operating as the reference receiver based on receiving the release from the serving network node.

As indicated above, FIG. 2 is provided as an example. Other examples are possible, according to some embodiments.

FIG. 3 illustrates an example of a beam update, according to some embodiments. FIG. 3 illustrates a scenario 300 prior to correction of beam orientation, and a scenario 302 after correction of the beam orientation. In particular, in the scenario 300, a network node is transmitting two downlink beams (DL PRS 1 and DL PRS 2) to a UE, and in the scenario 302, the network node is transmitting the same downlink beams as in the scenario 300 and an additional downlink beam (DL PRS 3). For example, this depicts the scenario 300 where broader DL PRS beams are causing location estimation errors prior to the correction and then the scenario 302 where pointing narrower DL PRS beams after correction can improve the location estimation accuracy.

As described above, FIG. 3 is provided as an example. Other examples are possible, according to some embodiments.

Figure 4:
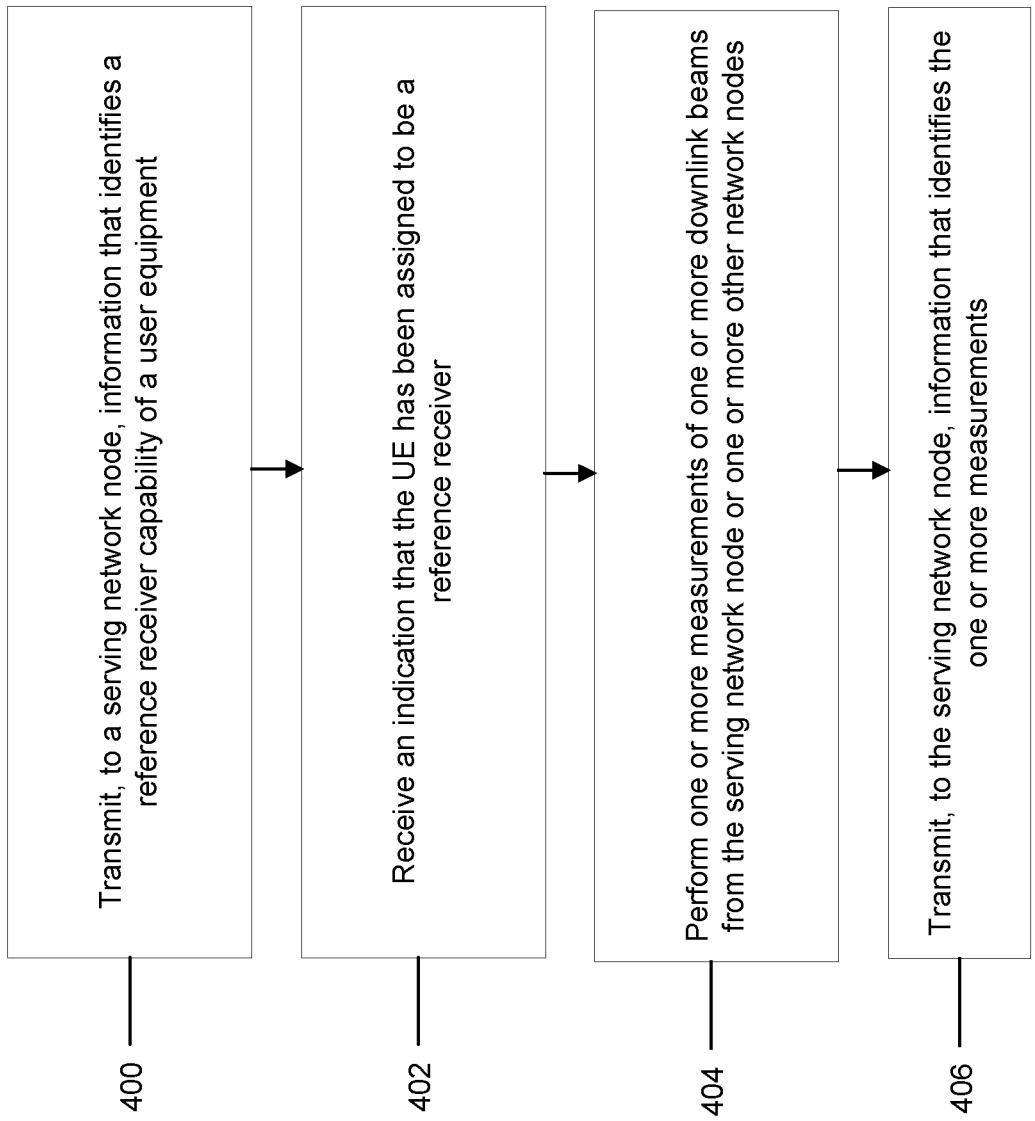
FIG. 4 illustrates an example flow diagram of a method, according to some embodiments.

FIG. 4 illustrates an example flow diagram of a method, according to some embodiments. For example, FIG. 4 shows example operations of a UE (e.g., apparatus 20). Some of the operations illustrated in FIG. 4 may be similar to some operations shown in, and described with respect to, FIGS. 1-3.

In an embodiment, the method may include, at 400, transmitting, to a serving network node, information that identifies a reference receiver capability of a UE, for example, in a manner similar to that described at 200. The method may include, at 402, receiving an indication that the UE has been assigned to be a reference receiver, for example, in a manner similar to that described at 204-1. The method may include, at 404, performing one or more measurements of one or more downlink beams from the serving network node or one or more other network nodes, for example, in a manner similar to that described at 208 and 210. The one or more measurements may comprise at least one of: one or more location-related measurements, one or more orientation-related measurements, one or more received signal strength measurements, one or more beam angle measurements, or one or more LoS indications. The method may include, at 406, transmitting, to the serving network node, information that identifies the one or more measurements, for example, in a manner similar to that described at 212.

As described above, FIG. 4 is provided as an example. Other examples are possible according to some embodiments.

Figure 5:
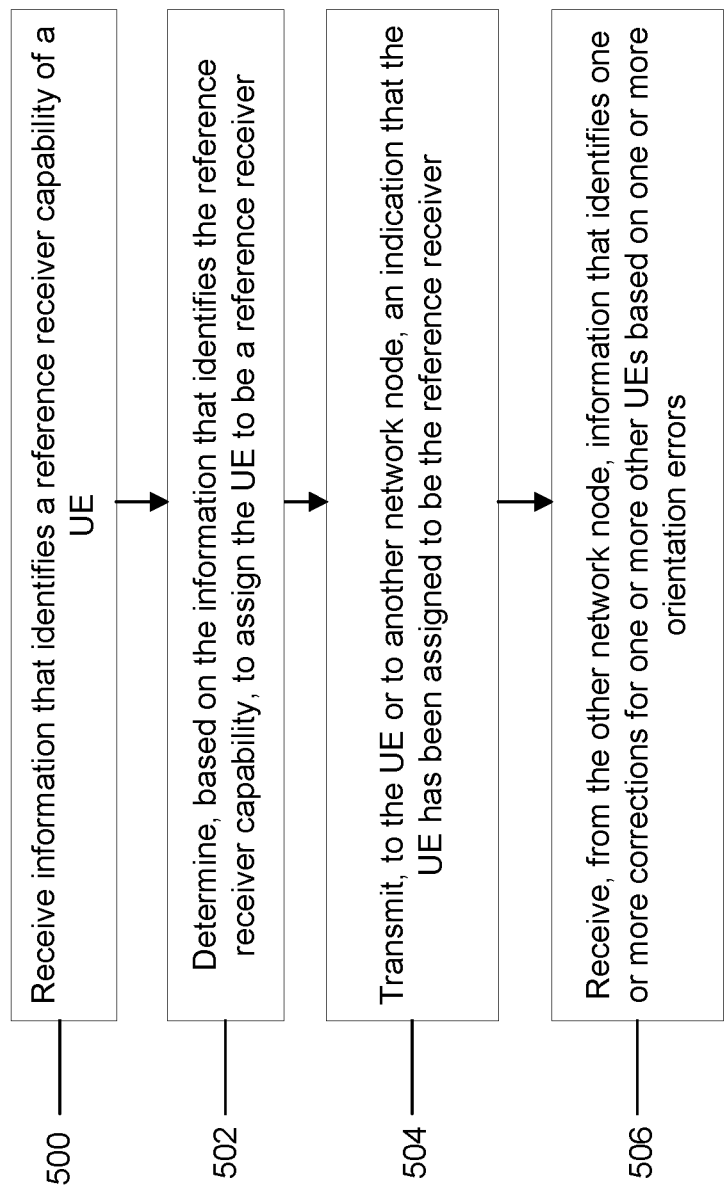
FIG. 5 illustrates an example flow diagram of a method, according to some embodiments.

FIG. 5 illustrates an example flow diagram of a method, according to some embodiments. For example, FIG. 5 shows example operations of a network node (e.g., apparatus 10), such as a serving network node. Some of the operations illustrated in FIG. 5 may be similar to some operations shown in, and described with respect to, FIGS. 1-3.

In an embodiment, the method may include, at 500, receiving information that identifies a reference receiver capability of a UE, for example, in a manner similar to that described at 200. The method may include, at 502, determining, based on the information that identifies the reference receiver capability, to assign the UE to be a reference receiver, for example, in a manner similar to that described at 202. The method may include, at 504, transmitting, to the UE or to another network node, an indication that the UE has been assigned to be the reference receiver, for example, in a manner similar to that described at 204-1 and 204-2. The method may include at 506, receiving, from the other network node, information that identifies one or more corrections for one or more other UEs based on one or more orientation errors, for example, in a manner similar to that described at 216.

As described above, FIG. 5 is provided as an example. Other examples are possible according to some embodiments.

Figure 6:
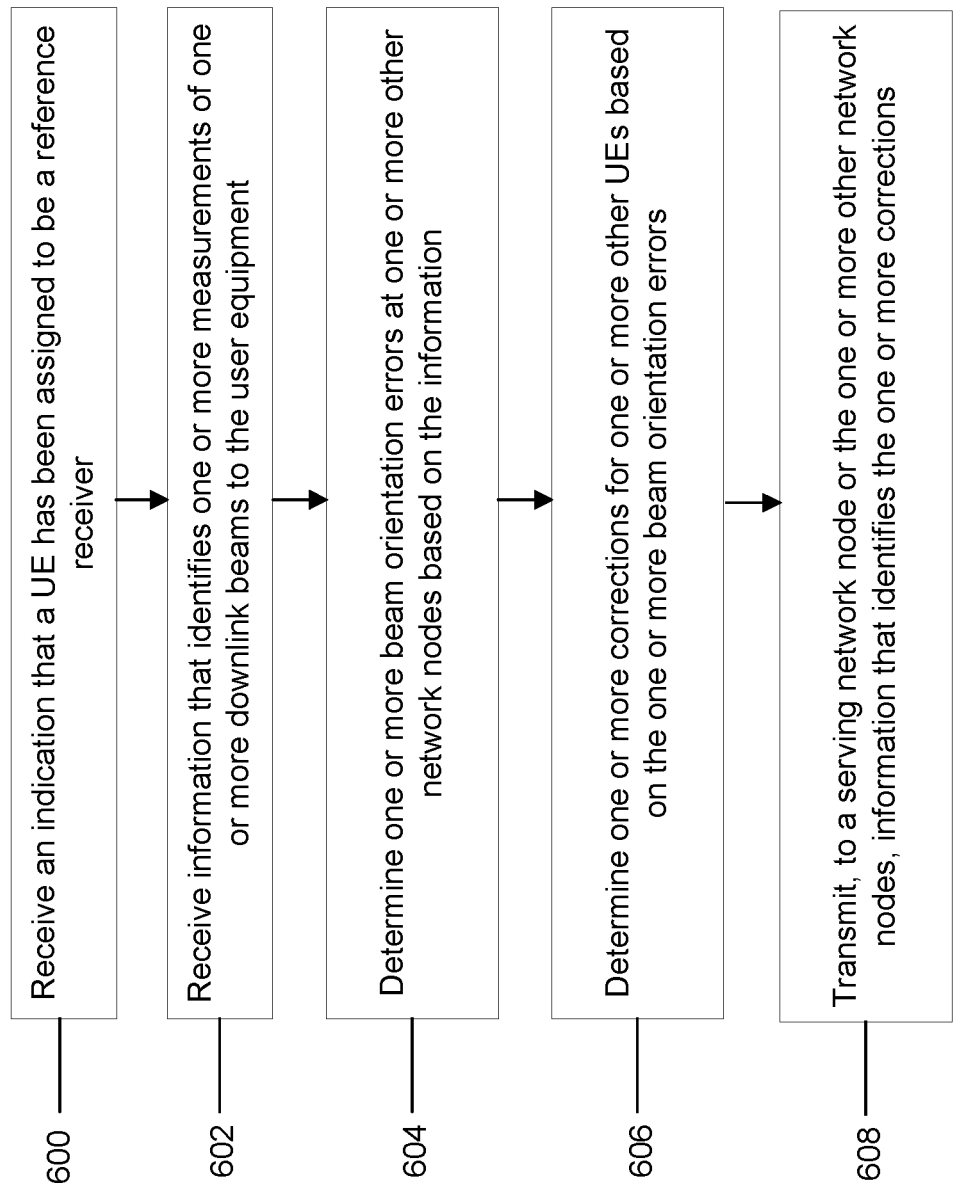
FIG. 6 illustrates an example flow diagram of a method, according to some embodiments.

FIG. 6 illustrates an example flow diagram of a method, according to some embodiments. For example, FIG. 6 shows example operations of a network node (e.g., apparatus 10), such as a LMF. Some of the operations illustrated in FIG. 6 may be similar to some operations shown in, and described with respect to, FIGS. 1-3.

In an embodiment, the method may include, at 600, receiving an indication that a UE has been assigned to be a reference receiver, for example, in a manner similar to that described at 204-2. The method may include, at 602, receiving information that identifies one or more measurements of one or more downlink beams to the UE, for example, in a manner similar to that described at 212. The one or more measurements may comprise at least one of: one or more location-related measurements, one or more received signal strength measurements, one or more orientation-related measurements, one or more beam angle measurements, or one or more line-of-sight indications. The method may include, at 604, determining one or more beam orientation errors at one or more other network nodes based on the information, for example, in a manner similar to that described at 214. The method may include, at 606, determining one or more corrections for one or more other UEs based on the one or more beam orientation errors, for example, in a manner similar to that at 214. The method may include, at 608, transmitting, to a serving network node or the one or more other network nodes, information that identifies the one or more corrections, for example, in a manner similar to that described at 216.

As described above, FIG. 6 is provided as an example. Other examples are possible according to some embodiments.

Figure 7A:
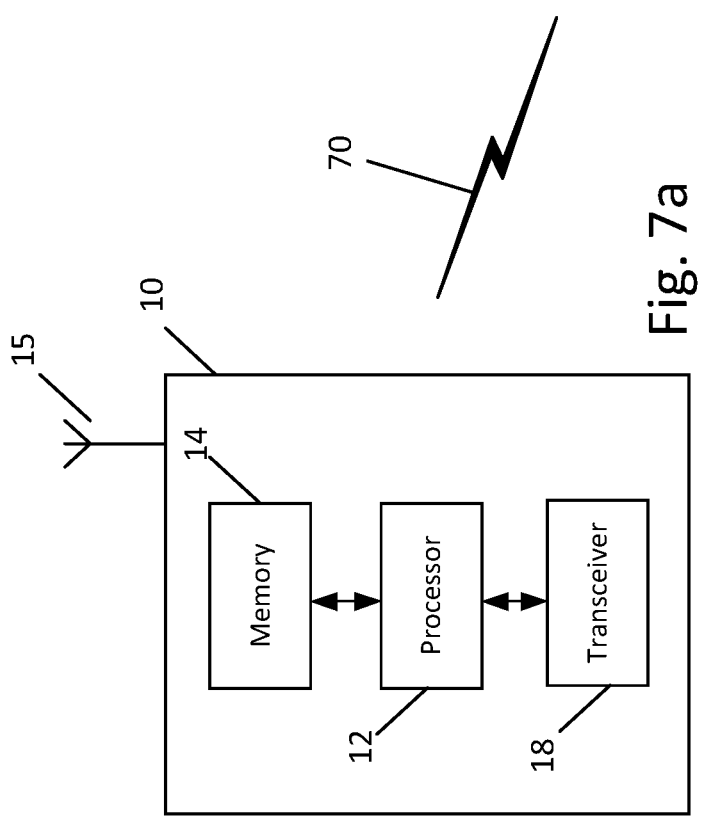
FIG. 7a illustrates an example block diagram of an apparatus, according to an embodiment.

FIG. 7a illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), a LMF, and/or a WLAN access point, associated with a radio access network, such as a LTE network, 5G or NR. In example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 7a.

As illustrated in the example of FIG. 7a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations of flow or signaling diagrams illustrated in FIGS. 1-6. For example, apparatus 10 may be controlled by memory 14 and processor 12 to perform the methods of FIG. 5 and/or FIG. 6.

Figure 7B:
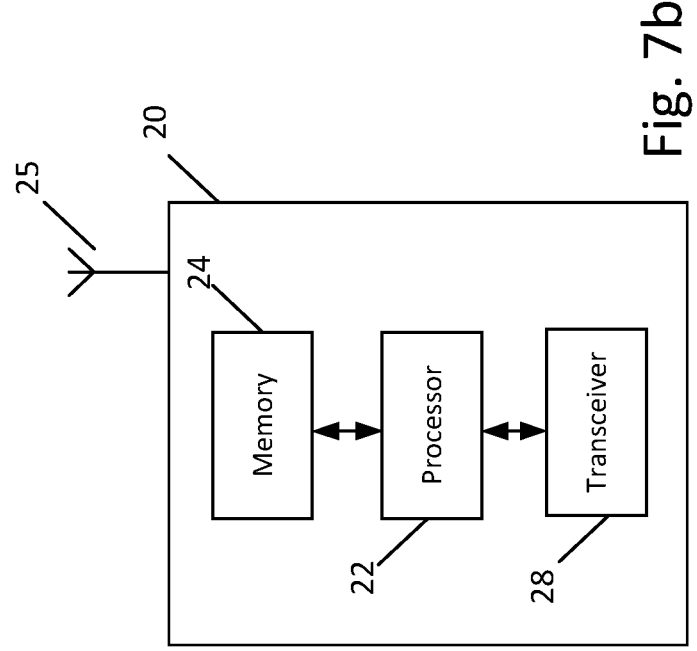
FIG. 7b illustrates an example block diagram of an apparatus, according to another embodiment.

FIG. 7b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7b.

As illustrated in the example of FIG. 7b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally, or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIGS. 1-6. For instance, apparatus 20 may be controlled by memory 24 and processor 22 to perform the method of FIG. 4.

Therefore, certain example embodiments provide several technological improvements, enhancements, and/or advantages over existing technological processes. For example, one benefit of some example embodiments is improved positioning by compensating for network node orientation offsets. As another example, one benefit of some example embodiments is improved coverage through downlink beam adjustment. As another example, one benefit of some example embodiments is increasing the number of virtual anchors through definition of virtual anchors. Accordingly, the use of some example embodiments results in improved functioning of communications networks and their nodes and, therefore constitute an improvement at least to the technological field of UE positioning estimates, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

According to a first embodiment, a method may include transmitting, by a user equipment to a serving network node, information that identifies a reference receiver capability of the user equipment. The method may include performing one or more measurements of one or more downlink beams from the serving network node or one or more other network nodes. The one or more measurements may include at least one of one or more location-related measurements, one or more orientation-related measurements, one or more received signal strength measurements, one or more beam angle measurements, or one or more line-of-sight indications. The method may include transmitting, to the serving network node, information that identifies the one or more measurements.

In a variant, the method may include transmitting, to the serving network node in association with the information that identifies the reference receiver capability, additional information that identifies at least one of whether the user equipment has acquired a position estimate of the user equipment within a threshold amount of time, whether the user equipment is travelling at a speed that satisfies a threshold, or whether the user equipment has been assigned to be a reference receiver within another threshold amount of time. In a variant, the information that identifies the reference receiver capability may identify at least one of an accuracy of the reference receiver capability, or a quality of the reference receiver capability.

In a variant, the method may include receiving an indication that the user equipment has been assigned to be a reference receiver. In a variant, the indication may comprise information that identifies at least one of the one or more measurements to be performed by the user equipment, or a rate at which the user equipment is to perform the one or more measurements.

According to a second embodiment, a method may include receiving, by a network node, information that identifies a reference receiver capability of a user equipment. The method may include determining, based on the information that identifies the reference receiver capability, to assign the user equipment to be a reference receiver. The method may include transmitting, to the user equipment or to another network node, an indication that the user equipment has been assigned to be the reference receiver.

In a variant, the information that identifies the reference receiver capability may identify at least one of an accuracy of the reference receiver capability, or a quality of the reference receiver capability. In a variant, the method may include receiving, in association with the information that identifies the reference receiver capability, additional information that identifies at least one of whether the user equipment has acquired a position estimate of the user equipment within a threshold amount of time, whether the user equipment is travelling at a speed that satisfies a threshold, or whether the user equipment has been assigned to be a reference receiver within another threshold amount of time. In a variant, determining to assign the user equipment may further include determining to assign the user equipment based on the additional information.

In a variant, the indication may comprise information that identifies at least one of one or more measurements to be performed by the user equipment, or a rate at which the user equipment is to perform the one or more measurements. In a variant, the method may include determining to assign the user equipment based on determining at least one of that one or more other user equipment associated with the network node are associated with position estimates below a threshold quality and at a rate that satisfies a threshold, or ping-pong handovers at a rate that satisfies another threshold. In a variant, the one or more other user equipment may be served by a same serving beam as the user equipment. In a variant, the method may include determining that an update to a reference signal configuration has occurred, or that the network node needs to perform a virtual anchor determination for a serving beam of the user equipment.

In a variant, the method may include receiving, from the other network node, information that identifies one or more corrections for one or more other user equipment based on one or more orientation errors. In a variant, the method may include correcting one or more beam orientations based on the one or more corrections. In a variant, the method may include updating a configuration associated with one or more downlink beams based on the information that identifies the one or more corrections.

According to a third embodiment, a method may include receiving, by a network node, an indication that a user equipment has been assigned to be a reference receiver. The method may include receiving information that identifies one or more measurements of one or more downlink beams to the user equipment. The one or more measurements may include at least one of one or more location-related measurements, one or more orientation-related measurements, one or more received signal strength measurements, one or more beam angle measurements, or one or more line-of-sight indications. The method may include determining one or more beam orientation errors at one or more other network nodes based on the information. The method may include determining one or more corrections for one or more other user equipment based on the one or more beam orientation errors.

In a variant, the method may include transmitting, to a serving network node or the one or more other network nodes, information that identifies the one or more corrections. The method may include transmitting, to the serving network node or the one or more other network nodes, an update to a configuration of one or more downlink beams based on the information that identifies the one or more corrections. In a variant, the one or more corrections may be associated with correcting location estimation by the one or more other user equipment.

In a variant, the method may include generating a propagation map based on the information that identifies the one or more measurements, and utilizing the propagation map for one or more radio resource management functions. In a variant, the method may include receiving information that identifies a reference receiver capability of the user equipment. In a variant, the method may include determining, based on the information that identifies the reference receiver capability, to assign the user equipment to be the reference receiver.

A fourth embodiment may be directed to an apparatus including at least one processor and at least one memory comprising computer program code. The at least one memory and computer program code may be configured, with the at least one processor, to cause the apparatus at least to perform the method according to the first embodiment, the second embodiment, the third embodiment, the fourth embodiment, the fifth embodiment, the sixth embodiment, the seventh embodiment, the eighth embodiment, the ninth embodiment, or the tenth embodiment, or any of the variants discussed above.

A fifth embodiment may be directed to an apparatus that may include circuitry configured to perform the method according to the first embodiment, the second embodiment, the third embodiment, the fourth embodiment, the fifth embodiment, the sixth embodiment, the seventh embodiment, the eighth embodiment, the ninth embodiment, or the tenth embodiment, or any of the variants discussed above.

A sixth embodiment may be directed to an apparatus that may include means for performing the method according to the first embodiment, the second embodiment, the third embodiment, the fourth embodiment, the fifth embodiment, the sixth embodiment, the seventh embodiment, the eighth embodiment, the ninth embodiment, or the tenth embodiment, or any of the variants discussed above. Examples of the means may include one or more processors, memory, and/or computer program codes for causing the performance of the operation.

A seventh embodiment may be directed to a computer readable medium comprising program instructions stored thereon for performing at least the method according to the first embodiment, the second embodiment, the third embodiment, the fourth embodiment, the fifth embodiment, the sixth embodiment, the seventh embodiment, the eighth embodiment, the ninth embodiment, or the tenth embodiment, or any of the variants discussed above.

An eighth embodiment may be directed to a computer program product encoding instructions for performing at least the method according to the first embodiment, the second embodiment, the third embodiment, the fourth embodiment, the fifth embodiment, the sixth embodiment, the seventh embodiment, the eighth embodiment, the ninth embodiment, or the tenth embodiment, or any of the variants discussed above.

Partial Glossary

AoA Angle of Arrival
C-RNTI Cell Radio Network Temporary Identifier
CU Centralized Unit
DL AoD Downlink Angle of Departure
DL PRS Downlink Positioning Reference Signal
DMRS Demodulation Reference Signal
DU Distributed Unit
gNB 5G node B
HO Handover
LMF Location Management Function
LOS Line of Sight
NB Narrow Beam
RSRP Reference Signal Received Power
RTK-GNSS Real Time Kinematic Global Navigation Satellite System
SRS Sounding Reference Signal
ToA Time of Arrival
UE User Equipment

We claim:

1. A method, comprising:
   transmitting, by a user equipment to a serving network node, information that identifies a reference receiver capability of the user equipment, and, in association with the information that identifies the reference receiver capability, additional information that identifies one or more of a position estimate or a travel speed of the user equipment and additional information that identifies at least one of:
   whether the user equipment has acquired a position estimate of the user equipment within a threshold amount of time, or
   whether the user equipment has been assigned to be a reference receiver within another threshold amount of time;
   performing one or more measurements of one or more downlink beams from the serving network node or one or more other network nodes, wherein the one or more measurements comprise at least one of: one or more location-related measurements, one or more orientation-related measurements, one or more received signal strength measurements, one or more beam angle measurements, or one or more line-of-sight indications; and
   transmitting, to the serving network node, information that identifies the one or more measurements.

2. The method according to claim 1, further comprising:
   transmitting, to the serving network node in association with the information that identifies the reference receiver capability, additional information that identifies at least one of:
   whether the user equipment is travelling at a speed that satisfies a threshold.

3. The method according to claim 1, wherein the information that identifies the reference receiver capability identifies at least one of:
   an accuracy of the reference receiver capability, or
   a quality of the reference receiver capability.

4. The method according to claim 1, further comprising:
   receiving an indication that the user equipment has been assigned to be a reference receiver.

5. The method according to claim 4, wherein the indication comprises information that identifies at least one of:
   the one or more measurements to be performed by the user equipment, or
   a rate at which the user equipment is to perform the one or more measurements.

* * * * *